United States Patent
Goldman

(10) Patent No.: US 8,984,076 B1
(45) Date of Patent: Mar. 17, 2015

(54) SYSTEM-FACILITATED LEVERAGING OF RELATIONSHIPS

(75) Inventor: Neal Goldman, New York, NY (US)

(73) Assignee: Relationship Science LLC, New York, NY (US)

( * ) Notice: Subject to any disclaimer, the term of this patent is extended or adjusted under 35 U.S.C. 154(b) by 25 days.

(21) Appl. No.: 13/548,184

(22) Filed: Jul. 12, 2012

Related U.S. Application Data

(60) Provisional application No. 61/507,106, filed on Jul. 12, 2011.

(51) Int. Cl.
*G06F 17/30* (2006.01)
*G06F 15/16* (2006.01)

(52) U.S. Cl.
USPC .......................................... 709/206

(58) Field of Classification Search
CPC ........ G06Q 99/00; G06Q 30/00; G06F 13/00; G06F 15/00; G06F 15/16–15/177; G06F 19/322; G07F 7/00; H04W 4/12
USPC .......... 709/201–203, 206, 218, 220, 223, 229
See application file for complete search history.

(56) References Cited

U.S. PATENT DOCUMENTS

| | | | | |
|---|---|---|---|---|
| 7,412,499 | B2 * | 8/2008 | Chang et al. | 709/220 |
| 8,185,558 | B1 * | 5/2012 | Narayanan et al. | 707/798 |
| 8,386,482 | B2 | 2/2013 | Gopalakrishnan | |
| 8,549,061 | B2 * | 10/2013 | Rao et al. | 709/200 |
| 8,572,129 | B1 * | 10/2013 | Lee et al. | 707/798 |
| 8,736,612 | B1 * | 5/2014 | Goldman et al. | 345/440 |
| 8,773,437 | B1 * | 7/2014 | Goldman et al. | 345/440 |
| 2003/0187813 | A1 * | 10/2003 | Goldman et al. | 707/1 |
| 2006/0020886 | A1 | 1/2006 | Agrawal et al. | |
| 2006/0075335 | A1 | 4/2006 | Gloor | |
| 2006/0136419 | A1 * | 6/2006 | Brydon et al. | 707/9 |
| 2006/0262772 | A1 * | 11/2006 | Guichard et al. | 370/351 |
| 2007/0124291 | A1 | 5/2007 | Hassan | |
| 2008/0071796 | A1 | 3/2008 | Ghuneim et al. | |
| 2008/0086343 | A1 | 4/2008 | Pendergraft et al. | |
| 2008/0270615 | A1 * | 10/2008 | Centola et al. | 709/228 |
| 2009/0018918 | A1 | 1/2009 | Moneypenny et al. | |
| 2009/0027392 | A1 | 1/2009 | Jadhav et al. | |
| 2009/0106822 | A1 | 4/2009 | Obasanjo et al. | |
| 2009/0228296 | A1 | 9/2009 | Ismalon | |

(Continued)

OTHER PUBLICATIONS

My people know your people; social networking software can be used to make business connections that lead to new deals (Horowitz, Alan; Mar. 29, 2004).*

(Continued)

*Primary Examiner* — Brian J Gillis
*Assistant Examiner* — Boris Grijalva Lobos
(74) *Attorney, Agent, or Firm* — Aka Chan LLP

(57) ABSTRACT

A system facilitates helping make introductions between users of the system. The system includes information on important and influential people using a social graph to represent relationships between these people and users of the system. Who you know is an important asset and is a typically closely guarded asset. With the system, users can help others users in the system they are allied with to do favors for each other from time to time. The value of the system increases since having one or more allies will encourage the user to ask more of their close friends to be users of the system so that they can be allies. As the system becomes more powerful for the user, he will value the system more highly, be more satisfied, use it more and recommend it more to his friends.

27 Claims, 5 Drawing Sheets

(56) References Cited

U.S. PATENT DOCUMENTS

| | | |
|---|---|---|
| 2009/0259599 A1 | 10/2009 | Wallman |
| 2009/0299785 A1* | 12/2009 | Savjani et al. .................. 705/7 |
| 2010/0082695 A1 | 4/2010 | Hardt |
| 2010/0119053 A1 | 5/2010 | Goeldi |
| 2010/0153185 A1 | 6/2010 | Ghosh et al. |
| 2010/0223097 A1* | 9/2010 | Kramer et al. ................ 705/10 |
| 2010/0241638 A1 | 9/2010 | O'Sullivan et al. |
| 2010/0268719 A1 | 10/2010 | Cormode et al. |
| 2010/0274815 A1 | 10/2010 | Vanasco |
| 2010/0332405 A1* | 12/2010 | Williams .................... 705/319 |
| 2011/0029521 A1 | 2/2011 | Thayne et al. |
| 2011/0037766 A1 | 2/2011 | Judy et al. |
| 2011/0055186 A1 | 3/2011 | Gopalakrishnan |
| 2011/0106895 A1* | 5/2011 | Ventilla et al. .............. 709/206 |
| 2011/0167059 A1* | 7/2011 | Fallah ......................... 707/723 |
| 2011/0173046 A1 | 7/2011 | Dey et al. |
| 2011/0295626 A1 | 12/2011 | Chen et al. |
| 2012/0079023 A1 | 3/2012 | Tejada-Gamero et al. |
| 2012/0096002 A1* | 4/2012 | Sheehan et al. ............. 707/737 |
| 2012/0166348 A1 | 6/2012 | Dyagilev et al. |
| 2012/0197834 A1 | 8/2012 | Panigrahy et al. |
| 2012/0209832 A1 | 8/2012 | Neystadt et al. |
| 2012/0232998 A1 | 9/2012 | Schoen |
| 2012/0246087 A1* | 9/2012 | Talati et al. ................... 705/319 |
| 2012/0303703 A1 | 11/2012 | Richter et al. |
| 2012/0310929 A1* | 12/2012 | Patterson et al. ............. 707/728 |
| 2012/0317088 A1 | 12/2012 | Pantel et al. |
| 2013/0013700 A1* | 1/2013 | Sittig et al. ................... 709/206 |
| 2013/0019262 A1 | 1/2013 | Bhatia et al. |
| 2013/0135314 A1 | 5/2013 | Haggerty et al. |
| 2013/0191416 A1* | 7/2013 | Lee et al. ...................... 707/771 |

OTHER PUBLICATIONS

U.S. Appl. No. 13/548,191, filed Jul. 12, 2012, (see file history incl. office action with notification date of Jan. 27, 2014).

U.S. Appl. No. 13/225,380, filed Sep. 2, 2011, (see file history incl. office action with notification date of Feb. 6, 2014).

U.S. Appl. No. 13/224,138, filed Sep. 1, 2011, (see file history incl. office action with notification date of Mar. 21, 2014).

U.S. Appl. No. 13/547,851, filed Jul. 12, 2012, (see file history incl. office action with notification date of Jan. 27, 2014 and advisory action with notification date of Apr. 14, 2014).

Server definition, The Linux Information Project, May 16, 1995, retrieved Jan. 23, 2013 from http://www.linfo.org/server.html.

\* cited by examiner

SYSTEM-FACILITATED LEVERAGING OF RELATIONSHIPS

CROSS-REFERENCE TO RELATED APPLICATIONS

This patent application claims the benefit of U.S. provisional patent application 61/507,106, filed Jul. 12, 2011, which is incorporated by reference along with all other references cited in this application.

BACKGROUND OF THE INVENTION

The present invention relates to the field of information management, and more specifically, to providing an information resource where the content is organized using a social graph.

Social networking has become an important part of how people interact with the world around them. It allows its users to connect to persons of interest in their lives, while updating them on new things happening to those persons. However, social networks are only as useful as the information that is in it. For example, if your friends are not on one social network, it may not be useful to you at all, even if it contains a wealth of other information.

So social networking sites work hard to increase their user base and make themselves useful to users who have joined. For example, some sites have begun allowing companies and other non-natural entities to join their sites. Much like their natural person counterparts, this allows users of the site to keep in touch with companies, charities, celebrities, and others they are interested in. Some other sites have also tried to make it as easy as possible to invite your friends and others to setup accounts with them, to lower the burden of getting your friends to join a new site.

However, these methods have limited usefulness. Many times, people just sign up for a social networking site, but do not actively participate in it. This increases the number of users for the site, but does not help in adding new material to it. This reduces the value of the site since, for example, having your friend on the same site as you is helpful but if they are not active on it, it isn't a useful way to stay up-to-date with what is happening with them. Furthermore, many people find it annoying to be asked to join a social networking site and few want to make and maintain multiple accounts across several social networking sites. Particularly for high net worth individuals, they may feel that these sites do not offer a good return on their time; after setting up a profile on the site, they find it limiting in the value they can get from it (e.g., business connections, business opportunities, and other benefits).

Therefore, there is a need to provide ways to allow users to find value in a social networking system, that do not have the drawbacks of other methods.

BRIEF SUMMARY OF THE INVENTION

A system gathers information on important and influential people and builds a social graph. The information is organized based on this social graph and provided to users as a service. The system has an ontology and analytics to organize the people according to their overall power or influence (which can be called a influence index value) as well as their influence in a particular domain, relationships to other people or organizations, influence over others, indirect influences, and more. Users can enter as nodes in the social graph to explore potential relationships and commonalities with the influential people. Information in the social graph is continually updated as new news and information becomes available. Users can request and receive reports on people of interest as information is updated.

The system provides powerful features to a user, because it provides the user with opportunities they may not have otherwise had, by using the idea of allies. Who you know is an important asset and is a typically closely guarded asset. The idea of an "ally" is a close friend with whom the user and the ally will want to do favors for each other from time to time. The value of the system increases since having one or more allies will encourage the user to ask more of their close friends to be users of the system so that they can be allies. If the potential ally is not on the system, the user helps the system in recruiting a new user, by telling their friends about the service and educating them on the product and how it encourages cooperation among allies. As the system becomes more powerful for the user, he will value the system more highly, be more satisfied, use it more and recommend it more to his friends.

In an implementation, the method includes: providing a first user connected to a system with access to a social graph, where the first user is allied with a first set of nodes of the social graph; allowing the first user to enter a request to the system; determining using the system that a first relationship of a first node of the first set of nodes satisfies the request, where the first node represents a second user; and indicating to the second user they are able to satisfy the request, without indicating to the first user that the second user is able to satisfy the request. The method optionally includes allowing the second user to dismiss the request from the first user in the system, transparent to the first user.

In an implementation, the method includes if the second user agrees to satisfy the request, transmitting a message from the system to the first user that the second user is connected to the first node. The message can include a summary of the first relationship. The second user can agree to be an ally of the first user. Each node of the first set of nodes can be user nodes. Optionally, the second user is prevented from viewing membership in the first set of nodes. The first node can be a system-provided node. The first set of nodes can be selected by the first user. The social graph can contain system-provided nodes and each system-provided node is connected to at least one other system-provided node by system-provided edges. The first and second users are connected in the social graph by a user provided edge. The first relationship can include a path with at least one system-provided node and at least one system-provided edge in the social graph.

In an implementation, the method includes: providing a first user connected to a system with access to a social graph, where the first user is allied with a first set of nodes of the social graph; allowing the first user to enter a request to the system; determining using the system that a first relationship of a first node of the first set of nodes satisfies the request, where the first node represents a second user; determining using the system that a second relationship of the first node of the first set of nodes satisfies the request; and indicating to the second user they are able to satisfy the request based on the first and second relationships. The method optionally includes: allowing the user to select the first relationship and not the second relationship in the system; and transmitting a message from the system to the first user that the second user is connected to the first node by the first relationship. The indicating to the second user they are able to satisfy the request based on the first and second relationships does not indicate to the first user that the second user is able to satisfy the request. The request can include a group of persons represented by system-provided nodes in the social graph.

In an implementation, the method includes: providing a first user connected to a system with access to a social graph, where the first user is allied with a first set of nodes of the social graph; allowing the first user to enter a request to the system; identifying in the system a plurality of system-provided edges that correspond to the request; determining using the system that a first relationship of a first node of the first set of nodes satisfies the request, where the first node represents a second user and the first relationship includes a path containing at least one of the system-provided edges of the plurality of system-provided edges; and indicating to the second user they are able to satisfy the request. In an implementation, the request can be of a type of person, a business sector, or a geographic region.

Other objects, features, and advantages of the invention will become apparent upon consideration of the following detailed description and the accompanying drawings, in which like reference designations represent like features throughout the figures.

DETAILED DESCRIPTION OF THE INVENTION

Figure 1:
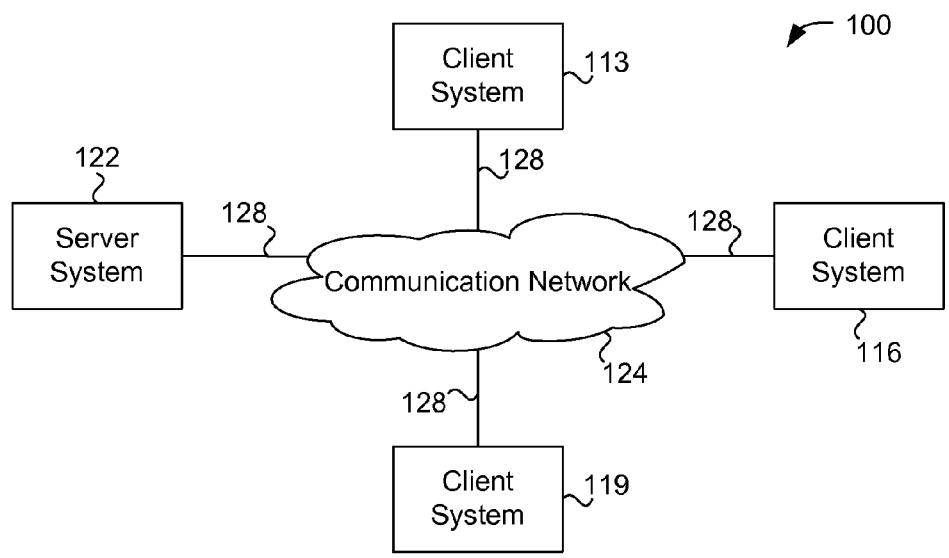
FIG. 1 shows a simplified block diagram of a distributed computer network within which a system of the invention can be implemented.

FIG. 1 shows a simplified block diagram of a distributed computer network 100 incorporating an embodiment of the present invention. Computer network 100 includes a number of client systems 113, 116, and 119, and a server system 122 coupled to a communication network 124 via a number of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like. Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server computer system which provides the information. For this reason, servers typically have more computing and storage capacity than client systems. However, a particular computer system may act as both as a client or a server depending on whether the computer system is requesting or providing information. Additionally, although the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server 122 or may alternatively be delegated to other servers connected to communication network 124.

Client systems 113, 116, and 119 enable users to access and query information stored by server system 122. In a specific embodiment, a "web browser" application executing on a client system enables users to select, access, retrieve, or query information stored by server system 122. Examples of web browsers include the Internet Explorer browser by Microsoft Corporation, the Firefox® browser by Mozilla Foundation, Chrome™ by Google Inc., WebKit™ which is a trademark of Apple Inc. and its variants, or others.

Figure 2:
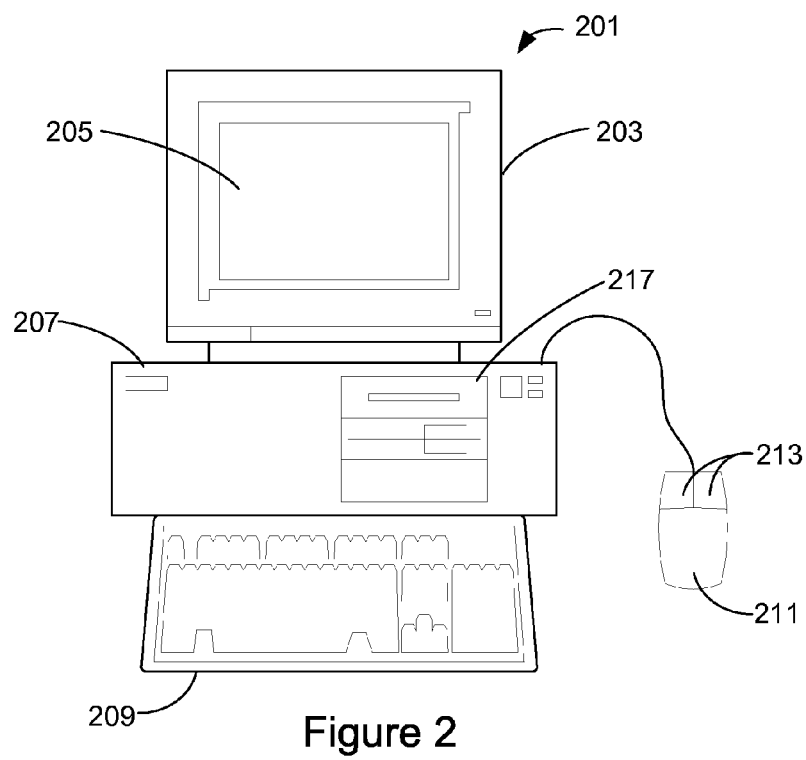
FIG. 2 shows a more detailed diagram of a computer system, client or server, which is used operate with the system.

FIG. 2 shows a more detailed diagram of a computer system which may be a client or server. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like. Mass storage devices 217 may include mass disk drives, floppy disks, Iomega ZIP™ disks, USB removable storage, magnetic disks, fixed disks, hard disks, hard drives including both magnetic and flash storage in a single drive unit, CD-ROMs, recordable CDs, DVDs, DVD-R, DVD-RW, HD-DVD, Blu-ray DVD, flash and other nonvolatile solid-state storage, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

The computer system in FIG. 2 is representative of electronic computing systems with a computer processor or central processing unit (CPU). These include servers, desktop computers, workstations, notebook or laptop computers, tablets, nettops, netbooks, smartphones, set-top boxes, media players, and many others. These can also include iPad™ which is a trademark of Apple Inc., iPhone™ which is a trademark of Apple Inc. PDAs, or phones running Google Inc.'s Android™ operating system phones.

Figure 3:
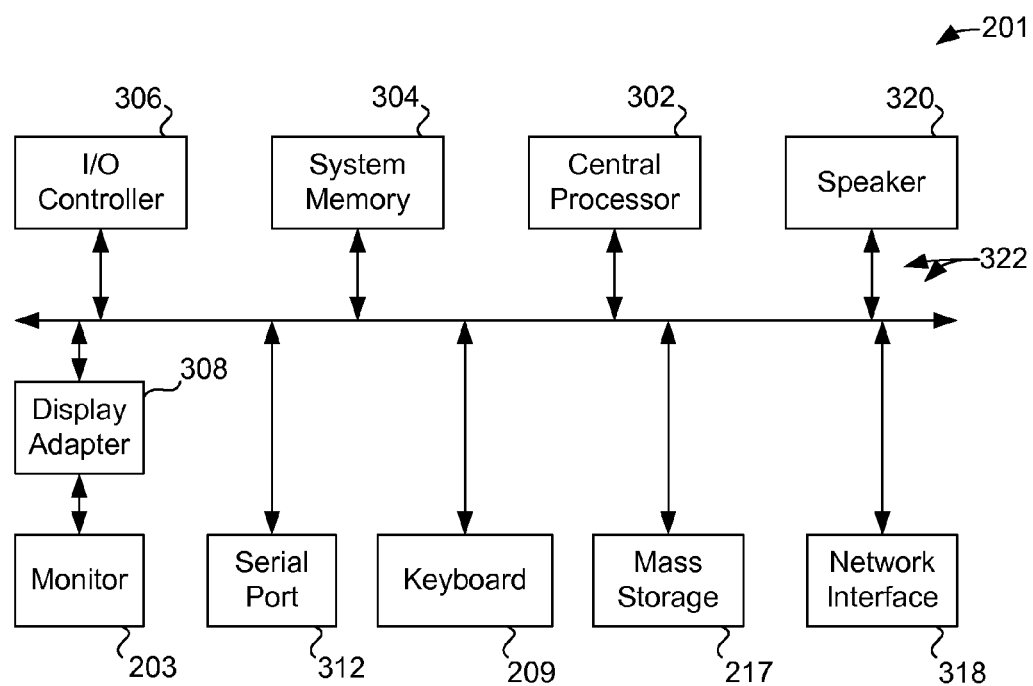
FIG. 3 shows a system block diagram of a computer system used to execute a software implementation of the invention.

FIG. 3 shows a system block diagram of computer system 201 used to execute the software of the present invention. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory. The processor may be a multicore processor, such as the Intel Core™ 2 Duo which is a trademark of Intel Corporation, Intel Pentium® D which is a trademark of Intel Corporation, AMD Athlon™ 64 X2 Dual-Core which is a trademark of Intel Corporation, AMD Phenom™, Microsoft Xbox 360™ central processing unit (CPU) which is a trademark of Microsoft Corporation, and ARM™ architecture based processors which is a trademark of ARM Inc (e.g., Nvida Tegra2™ which is a trademark of Nvida Corporation, Qualcomm Snapdragon™ which is a trademark of Qualcomm Incorporated, Apple A4™ which is a trademark of Apple Inc.).

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#™, Pascal™, Fortran™, Perl™, Matlab™ (from MathWorks, www.mathworks.com), SAS™ (from SAS Institute Inc.), SPSS™ (from IBM Company), JavaScript, AJAX, Java, SQL, dBase, Gremlin, Blueprints, Python, PHP, or Closure. The computer software product may be an independent application with data input and data display modules. Alternatively, the computer software products may be classes that may be instantiated as distributed objects. The computer software products may also be component software such as Java Beans™ (from Sun Microsystems) or Enterprise Java Beans™ (EJB from Sun Microsystems). An operating system for the system may be one of the Microsoft Windows® family of operating systems (e.g., Windows 95, 98, Me, Windows NT, Windows 2000, Windows XP, Windows Vista, Windows 7, Windows 8, Windows CE), Linux, UNIX, Sun OS, Ubuntu, or Macintosh OS X. Microsoft Windows is a trademark of Microsoft Corporation. Some mobile operating systems that can be used with an implementation of the invention include: Google Android, Chrome OS™ (from Google Inc.); Apple iOS4™ or iOS5™ (from Apple Inc.); Blackberry OS™ (from Blackberry Inc.); Windows Phone 7™ (from Microsoft Inc.).

Furthermore, the computer may be connected to a network and may interface to other computers using this network. For example, each computer in the network may perform part of the task of the many series of circuit simulation steps in parallel. Furthermore, the network may be an intranet, internet, or the Internet, among others. The network may be a wired network (e.g., using copper), telephone network (e.g., public switch telephone network or PSTN), packet network, an optical network (e.g., using optical fiber), or a wireless network, or any combination thereof. For example, data and other information may be passed between the computer and components (or steps) of a system of the invention using a wireless network using a protocol such as Wi-Fi (IEEE standards 802.11™, 802.11a™, 802.11b™, 802.11e™, 802.11g™, 802.11i™, and 802.11n™, just to name a few examples, which are trademarks of IEEE). Other information transmission standards that can be used in a system of the invention include: Bluetooth, wireless USB, WiMAX, EDGE, EV-DO, GPRS, HSPA, LTE, UMTS, Edge, 2G, 4G, LTE. For example, signals from a computer may be transferred, at least in part, wirelessly to components or other computers.

The system maps the world of influence through a large database, which can be stored in a variety of ways. A specific technique is through a combination of an entity graph and associated SQL database, but other database types may be used. The database is at its core a mapping of entities and relationships between those entities. Note that this can be done with an array of other technologies, all of which can be used to achieve the same result. A technique and implementation of the system scales nearly infinitely to handle all the real-world ways that people know each other and facts about them.

The system product allows the paid user or subscriber to step into the created world and see how they fit in. Moreover it provides them with information that allows them to move further in to this world of influence. The system can also be supported, in part or fully, by advertisements.

This idea of a person being "powerful" is to be described in more detail (e.g., see quantitative discussion below), but in a simple instance you can say President Barack Obama is the most important person in the world, and thus calculate every single person's importance by how well they know him and how many people removed they are (or how many people they know in common with him and how well). In practicality, several "sign posts" can be erected in each industry that allows for this type of sector power ranking to fall out. Also, this can be cut in a different way to show someone's overall power in the world (for instance).

In an implementation, a sign posts algorithm is used by human operators. These human operators can "bump up" a weight of a particular relationship, or entity in the graph.

In an implementation, the sign posts can alter the distribution of energy/influence in a graph based on a mathematical distribution (e.g., Bayesian distribution, Priors algorithm). Sign posts not only bias the centrality algorithm for influence amongst the entire graph, they can also be applied to effect centrality calculations for a particular domain.

Additionally, by means of the weighted path algorithm, the system can show how influential someone is over an organization, creative work, event, or a series of events. The system can calculate the weights between any two nodes in the graph, independent of their type. This can have to do with how closely they are (or have been) affiliated with an organization, but can also be more nuanced. For instance, a person who is very close to three board members (but himself is not a board member) may be (or possibly could be) a key influencer of that organization. Influence is also transitive, for example: (1)

CEO X controls Company Y, which in turn owns a controlling stake in company Z; (2) X has transitive power over the CEO of company Z; and (3) CEO W controls company A, which in turn owns a controlling stake in Company Y. We can determine that CEO of Company Y or CEO Z is very influenced by CEO W.

The system uses technology to collect this data, including pioneering innovative collection techniques (e.g., Internet connectivity, crawling, and filtering). Additionally, there can be a large team of people who "clean" this data. Given that the system is serving a very high-end clientele, the service needs to have very clean and precise data, which the human factor helps achieve.

Figure 4:
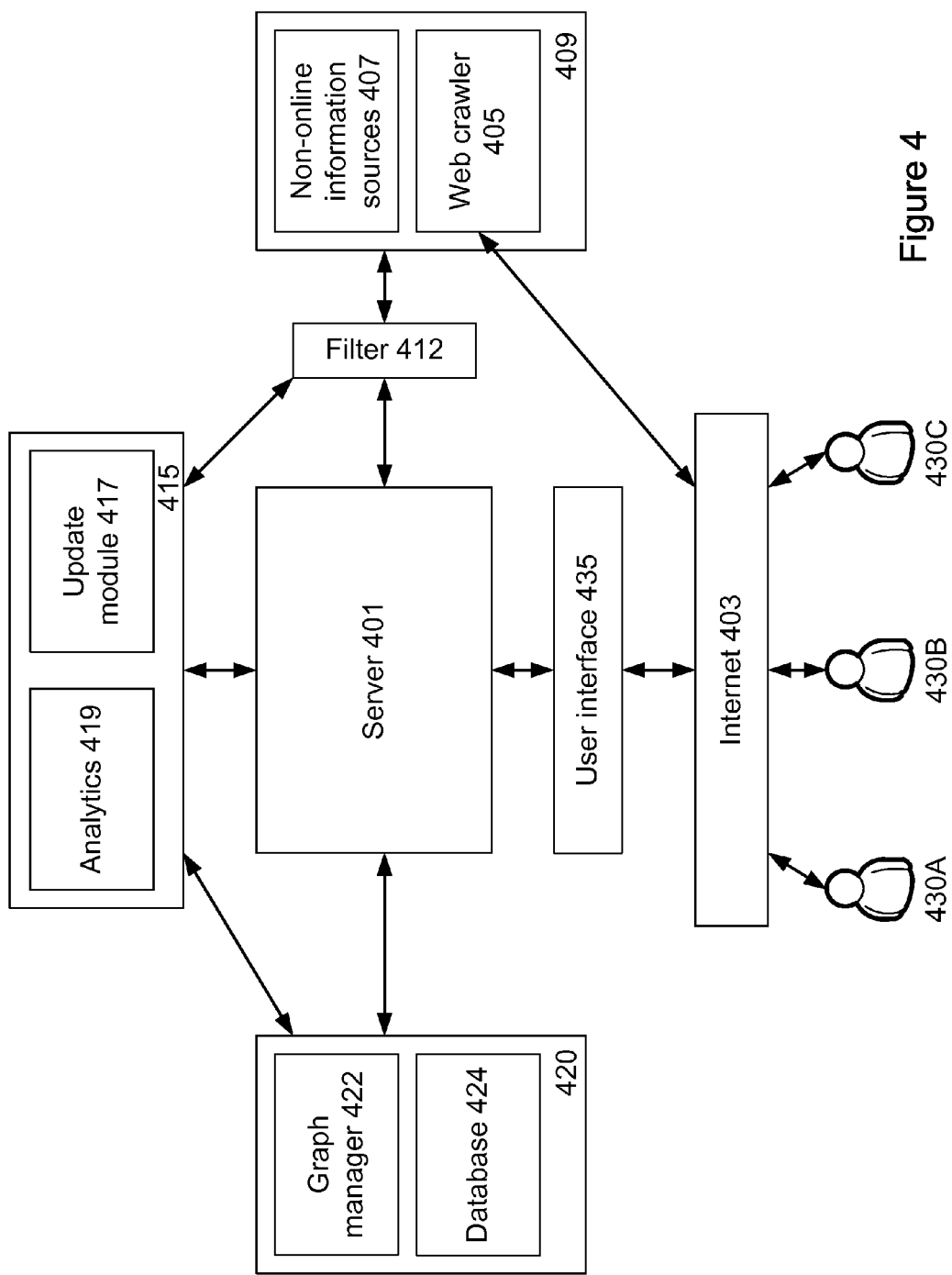
FIG. 4 shows a system diagram.

FIG. 4 shows a block diagram of an implementation of a system of the invention. The system gathers information on entities, people or organizations, from on-line and off-line sources. The information is organized using a social graph (having nodes and edges), so that social relationships between the information can be more easily determined. The system provides this information, organized by social graph, as an information resource service to users. Users can use the system as a tool to identify and make better connections to other people or organizations.

In an implementation, a server 401, having hardware such as described above, executes and stores software and data of the system. The server 401 receives information from an information gathering module 409, which can be take information from on-line or non-on-line (or off-line) sources, or both.

For on-line sources, a crawler module can be used. Via the Internet 403, a crawler module 405 (e.g., Web crawler) gathers information for the system from on-line sources and sends the collected information to the server 401. These on-line sources include Web pages and other unstructured information data sources.

The crawler module is a computer program that browses a network such as the Web or Internet in a methodical, automated manner in orderly fashion to gather desired information. The crawler can be embodied as ants, automatic indexers, Web crawlers, Web spiders, or Web robots. The sites the crawler retrieves information from can include public and closed sources. Some examples of closed sources include membership, closed-networks, and pay information services such as LexisNexis®, which is a registered trademark of LexisNexis.

For off-line sources 407, a research team can find relevant information and then put the information into electronic form for further handling by the system. Such off-line sources can include print (e.g., yellow pages, white pages, school yearbooks, old papers records that have not been put into electronic form) and other sources which are not available on-line. Some of these sources may be newspapers from countries other than the U.S. that do not have an on-line counterpart. Therefore, some of these sources may not be in English, and will be translated as needed (either by a translator (person) or by way of a machine translation) into English for inclusion into the system.

In an implementation, the information gathered (whether on-line or not on-line) is related to an entity, specific person, or organization. The person, or organization is one that the system tracks for its users. For example, the information may include all activities and news related to the specific person being tracked. These may include news about the person, stock purchases and sales, appearances as events, relationships with others, lawsuits, travel, identification of family members, new family members, contributions or donations to organizations, promotions, demotions, company changes, retirement, and others.

This information from information gathering module 409 is filtered by a filter module 412. The filter module 412 "cleans" the information by identifying the information relevant to the system, and discarding (e.g., removing or redacting) information that is not relevant or is of low relevance to the system. The filtering module may present a report of the proposed filtering to a person for approval or modification before being published live on the system.

After filtering, the information is transferred to an information processing block 415, which includes an update module 417 and analytics module 419. Update module 417 handles determining whether information in the system should be updated, since some of the information may be duplicative or not current. For information to be added to the system, the update module will handle performing updates (or request another module to do the update).

In the case the information is for a person already having a node in the social graph managed by the system, that node is updated. This node is a system-provided node because it is generated by the system, and not one which was created for or by a user or member of the system.

In the case the information is for a person that does not yet have a node, the update module will create the node (as a system-provided node) and create edges for the node as appropriate to link the new node to other system-provided nodes. Edges created by the system between the system-provided nodes are referred to as system-created edges.

Typically, the crawler module continually searches on-line sources for new information. It is desirable that an updates occur in real-time or soon as practicable, so that the information service offers timely information for its users or customers (e.g., 430A, 430B, and 430C). For any new information found, the update module 417 updates the social graph of the system.

The analytics module 419 performs analytics on the information of the system, such as calculating influence index values for each node and other metrics based on the social graph. The analytics module 419 uses algorithms, and the resulting metrics (e.g., influence or power ranking) can be continually update as the nodes are updated. For example, analytics include calculating or updating a influence index value (or power ranking) for a person. Analytics is described further in U.S. provisional patent application 61/507,106, filed Jul. 12, 2011, which is incorporated by reference.

Another feature of the system is to allow users to set-up watches on people being tracked by the system. Then when users log into the system, their home page will show updates and new news on the watched people since they last time they logged in. E-mail or other messages (e.g., SMS) can be sent to the users to alert users of new news for the watched people.

The system stores information, including the social graph, in a storage block 420. This storage block may be implemented using hard drives of the server or across multiple servers (or network-attached storage (NAS) drives). Storage module 420 includes a graph manager 422 and a database 424 module.

The graph manager module 422 manages the social graph of the system, adding, modifying, updating, or deleting information, nodes, and edges of the system. The social graph can be stored in a database structure. Each entry in the database can represent a node and include links, representing edges, to other entries or nodes. Other computer data structures can be used to implement a social graph of the system, including queues, stacks, pointers, arrays, linked lists, singly linked lists, doubly linked lists, and others, in any combination.

As example of graph manager operation, if a graph contains information about a person who is the chief executive officer (CEO) for a company A, but the person has resigned, the graph manager will update the CEO's system provided node to reflect the new information. The relationship of that person with company A may be removed or altered to show that the person is no longer company A's CEO. Also, information that was not previously in a graph can be added. For example, if the person from the previous example resigned from company A to take the CEO position for company B, the graph is updated to reflect this change. The system stores its information in the database, which can be access by the users of the system to see the updates.

The information of the system is provided as a service to users or subscribers 430A, 430B, and 430C. The users can pay a periodic charge (e.g., month, yearly, or other time period). The users can pay per use (e.g., a charge per search). The users can use the system for free, where the system is, e.g., ad supported or supported by revenue from other sources besides user fees. The system can have also have modules (not shown) for generating revenue by any one or combination of these revenue models.

In an implementation, the system has a Web interface so users can access the system via a Web browser at a client device. The client may be a mobile device such as a smartphone or tablet computer. Depending on what type of device the user 430A-430C is using, a user interface module 435 prepares and transmits a version (e.g., HTML or XML) suitable to the user's device. Also, the user interface module 435 prepares and selects what information to present. The system may have other interfaces, which can be used instead of or in combination with the Web interface, such as a dedicated application or app to connect to the service.

As discussed, the system organizes information about people or organizations using a social graph. By organizing information using a social graph, this can make it easier for viewers who access the information to determine the relationships and connections between the people (nodes) in the social graph. Using the social graph structure, a user can determine the degrees of separation between the nodes in the graph. A node can have any number of degrees of separation, one, two, three, four, five, six, seven, eight, nine, ten, or more. Generally, the more degrees of a separation one node is from another, the less strong the relationship is between those two nodes which represent two people. For example, the user can specify in a search term a number of degrees of separation in which to limit the search (e.g., search for two degrees or less) from a particular person, so that less strong connections can be omitted from the search results.

For a social graph, one degree of separation between two nodes means that the two nodes are connected via a single edge. Two degrees of separation between two nodes means that the two nodes are connected via two edges (passing through another node). Three degrees of separation between two nodes means that the two nodes are connected via three edges (passing through two other node). Therefore, n degrees of separation between two nodes means that the two nodes are connected via n edges (passing through n−1 other nodes).

Compared to, e.g., an HTML page or other data structure giving information on an individual, the social graph structure gives additional relationship information, which is very valuable in the context of a person trying to make relationship connections. With a social graph structure, an information page for a person of interest (person A), the user can see the people connected by a first-degree connection to person A. The person can connect via a link on person A's page to see another person, person B, who has a one-degree connection to person A. On the page for person B, the user will see all the one-degree connected people to person B, which includes person A.

With an HTML page, the relationship information is not inherent in the HTML structure. In fact, once one follows a link from one HTML page to another, the next HTML does not necessarily include a link back to the referring page. Information is lost when traversing from page to page. A social graph structure does not have this problem.

Although there can be any number of degrees of separation in a social graph, the system can allow the user to configure searches, calculations, and other operations to limit the numbers of degree of separate to a certain value m, an integer 1 or greater. By limiting the m, this can increase the speed of the system, since less information or nodes need to be considered. The user may want to leverage stronger relationships first, and such a user-configurable setting allows this.

As a further aspect of the system, after a user signs up and becomes a member or customer of the system. The system creates a node for the user, which is a ghost node in the system graph. This is in contrast to a system-provided node which is a node created by the system. Ghost nodes of the system are created for users of the system. Connections between ghost nodes and other nodes (e.g., system-provided nodes) are through ghost edges. A ghost node and its ghost edges is visible only to the user, and not others users of the system.

For the ghost node, the system allows the user to input information on the user. For example, this information can include people the users know, activities the user participates in, education of the user, and others information about the user. This user-input information can help the system identify connections to the system-provided nodes (people being tracked by the system).

The user can then tag people the user knows, organizations the user is affiliated with, and things the user likes. The more relationships the user adds the more they become plugged into the sphere of influence. Given the information provided by the user, the application runs weighted path algorithms in order to show the user to whom they are connected and how.

The system does not allow the activity of this ghost node to effect the way information is generated for other users. Since the information added by the user is applicable to that one person, this node is treated as a "ghost node." Any calculation that hits this part of the graph for any other user, realizes this is a ghost node, and the traversing at that part of the graph dies.

So, the system allows a person to enter ("virtually") into the graph for the user's own use, morphing and defining it for the user's own purpose without impacting other users, or the general makeup of the system's data. The ghost node will not interact or interfere with other ghost nodes for other users of the system.

Some specific flows for determining a technique of the invention are presented below, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Figures 5, 6:
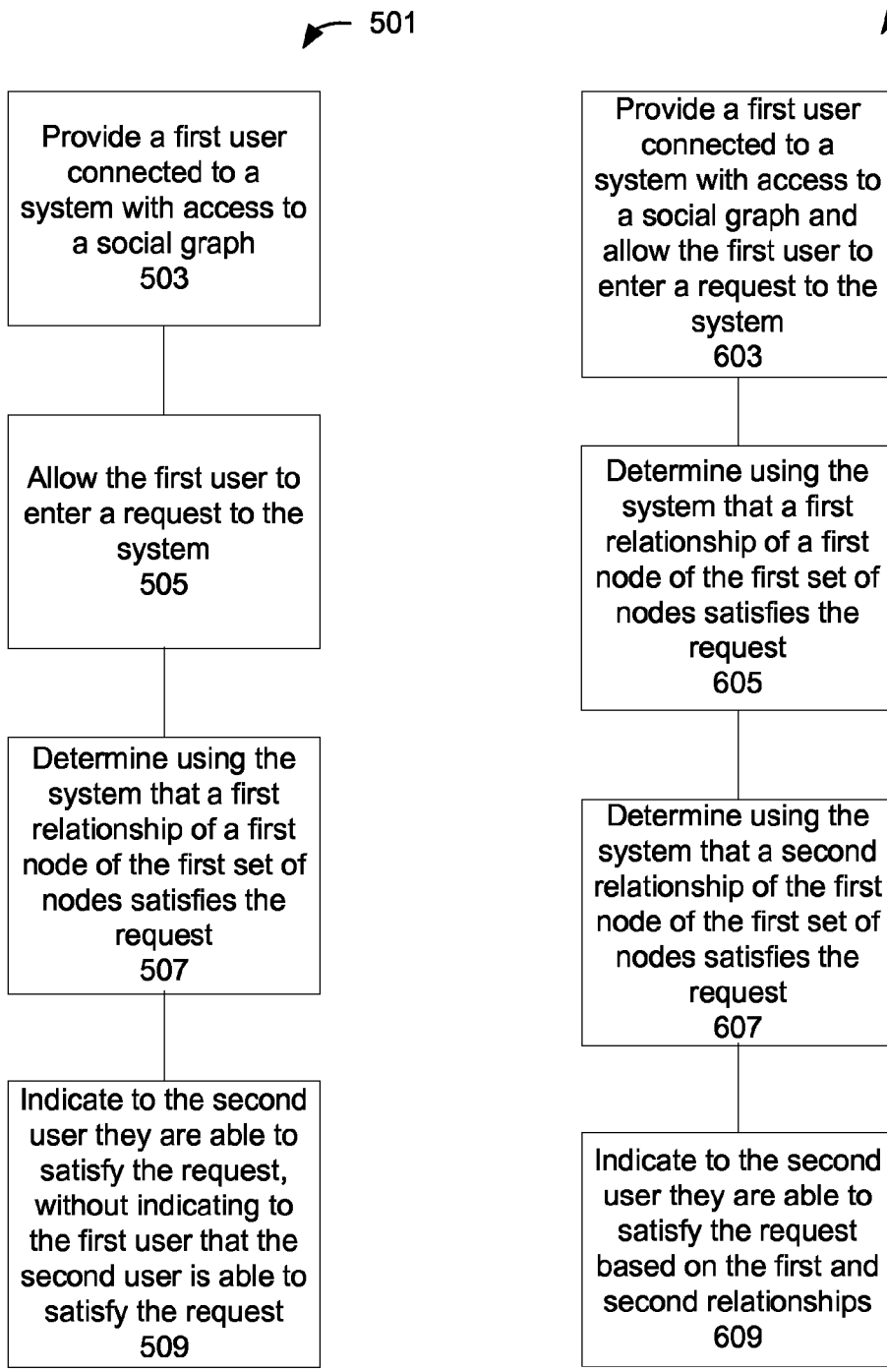
FIG. 5 shows a system flow.
FIG. 6 shows another system flow.

FIG. 5 shows a sample flow 501 of the system. In a step 503, the system provides a first user connected to a system with access to a social graph. For example, the first user can connect to the system, through the Internet. In a step 505, the system allows the first user to enter a request to the system. Some examples of requests are wanting to know a type of person tracked by the system (e.g., venture capitalist, founder in a specific technical field, and others), a specific person tracked in the system, a group of persons tracked by the system, and many others. In a step 507, the system determines that a first relationship of a first node of the first set of nodes satisfies the request. The system can identify a system-provided node that represents the request, and determine what system-provided edges are connected to the system-provided node. In a step 509, the system indicates to the second user they are able to satisfy the request, without indicating to the first user that the second user is able to satisfy the request. For example, the system can send an e-mail alert to a second user that they can do a favor for a first user, but not an alert to the first user.

FIG. 6 shows another sample flow 601 of the system. In a step 603, the system provides a first user connected to a system with access to a social graph and allow the first user to enter a request to the system. In a step 605, the system determines that a first relationship of a first node of the first set of nodes satisfies the request. For example, the system can analyze connections of the first node stored in the system, to determine whether any of their relationships can satisfy the request. In a step 607, the system determines using the system that a second relationship of the first node of the first set of nodes satisfies the request. For example, if a user's request is to get to know a person associated with the company Microsoft, the system can determines which nodes are associated with Microsoft by analyzing the edges connected to the node Microsoft. When it does this, the system can determine which ones are relevant; for example, an edge representing employment would be more relevant than an edge representing someone who holds only a few Microsoft common shares. In a step 609, the system indicates to the second user they are able to satisfy the request based on the first and second relationships. These relationships may be represented by edges in the social graph.

Figure 7:
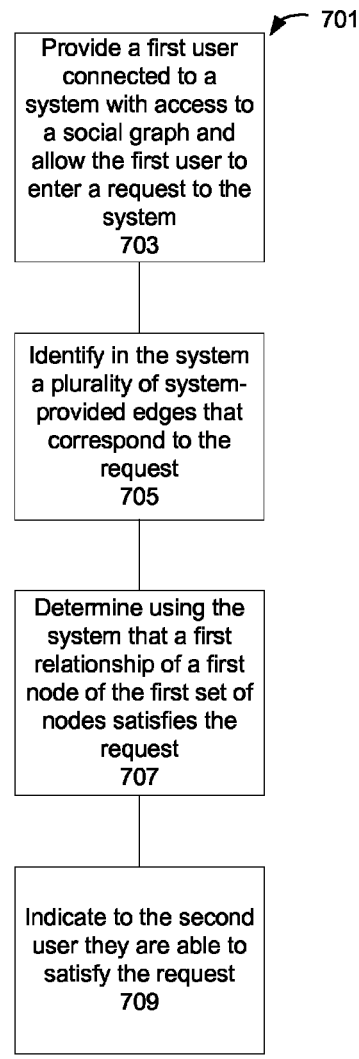
FIG. 7 shows another system flow.

FIG. 7 shows another sample flow 701 of the system. In a step 703, the system provides a first user connected to a system with access to a social graph and allows the first user to enter a request to the system. In a step 705, the system identifies in the system a plurality of system-provided edges that correspond to the request. For example, the system can identify a system-provided node related to the request and system-provided edges connected to the system-provided node that are relevant based on the request. In a step 707, the system determines using the system that a first relationship of a first node of the first set of nodes satisfies the request. In a step 709, the system indicates to the second user they are able to satisfy the request.

In an implementation, every piece of information is attributed with a "type." The type system is our ontology as information is broken down into a few major categories that organize different types of data. Entity types classify each entity, or node in the graph at the top level. In an implementation, entity types include: people, organizations, creative works, events, products, awards, places, and transactions. Each entity in the system can be categorized at very granular levels, and have multiple classifications, however, each entity must have exactly one top level type. Further information on these entity types follow:

(1) People. These are the natural persons in the system. Many of the other entities relate to one or more people in the system.

(2) Organization. For example, these are companies, non-profits, associations, fraternities, or others.

(3) Events. The system can track event such as business transactions, conferences, parties, award ceremonies, or others. These events can have influential or important persons in attendance.

(4) Creative Works. Creative works are films, TV shows, paintings, books, or others. These entities are important because they create additional connections between entities.

(5) Awards. Awards can be creative work awards, ranked lists, hall of fame memberships, Honorary Degrees, or others. Awards can be given to people, organizations, and creative works. These are usually given (or granted) by an organization.

(6) Products. Products are produced by companies. Products can be dealt with both on an abstract level (where one entity represents the product), or on a per instance level. Stocks issued by a company, both public and private types of stock, are dealt with as products.

(7) Places. Places are a special type of entity in that these entities must be defined in geo-spatial terms. Places can be both administrative regions (e.g., cities, states, countries) as well as points or physical places (e.g., restaurants, museums, offices)

(8) Transactions. Transactions are ownership events that involve two or more companies, and any number of people.

In an implementation, an organization as represented by a system-provided node is a collection of multiple people. These people can be also be represented as nodes, separate from the organization. For example, company A has a CEO who is person B. Company A can be represented as a company node, while person B can be represented as a person node. Person B will also be connected to company A. A benefit of using organizations is that it helps the system arrange its data and possibly decrease the amount of nodes in the system. For example, some organization can have many members or people. Using the example given previously, if there is a person C who is an entry-level associate at company A, the system does not need to create a person node to represent them. Instead, person C can be associated with the organization without a separate person node. This simplifies and reduces the information the system needs to store. Also, grouping by organizations assists a user of the system in making searches by allowing powerful queries based on an organization. For example, the system can tell a user not only who is in an organization, but whether another person is associated with the organization. For example, for a popular golf club (an organization), the user can find out not only who is a member of the club, but others associated with the club (e.g., people who make donations to the club, is a spouse of a member of the club). This allows the user to quickly expand their connections, by asking who is connected to an organization.

In an implementation, each entity can have [n] number of classifications. Entity classifications describe and categorize entities at a granular level. For example, Bill Gates is an {Entrepreneur}, {Technologist} and {Philanthropist}. Entity classifications are stored in a tree structure, the root of the tree converges at the master entity types, as discussed above.

In an implementation, a 0 to 1 score of a particular entity's influence over another is calculated on the fly with a weighted path algorithm, as discussed in further detail below. This score may be the result of a function based on: (1) predicate (type of relationship); (2) time (e.g., recency, length of time); (3) amount of incoming links of the same predicate, or (4) an array of attribute value pairs are based on the system's ontology and can modify the weight-in or weight-out of the edge. This includes all of the paths throughout the graph that link those two entities together.

In an implementation, the direction of a particular relationship type or edge label is defined in the "Relationship Types" system. A directed edge has a name and an inverse name, and different values for the default in/out weights. A bi directional edge has a NULL inverse name and has the same value for weight-in/weight-out. Some relationships, such as a friendship, has no direction, since there are no inverses. A direction is useful for representing other relationships, such as a father or employee, since directed relationships have are inverses. A fixed weight is used to calculate all relationships of a specific type. A fixed weight is associated with the inverse relationship (if is directed).

In an implementation, influence is determined in two ways by two master algorithms. These algorithms determine the influence that two entities in the graph have over each other and one entity's influence in the world. This includes:

1. A person's influence in the world (their centrality in the graph).
2. A person's influence over a particular person.
3. A person's influence in a particular sector.
4. A person's influence over other types of entities (e.g., person, organization, creative work, field of study).
5. A person's influence over a concept (e.g., the most influential people in mathematics).

In an implementation, a centrality algorithm is used. The centrality algorithm determines a person's overall influence in the world, which is a function of their influence over the people they know, and how powerful those people are. The more powerful people (quantity and quality) you know (the better), the more powerful you are. The more powerful those people are, the more powerful you are. The more powerful people the user knows, the more powerful those people are, and the closer the user knows those people, the more powerful you are.

In an implementation, weighted path algorithms are used to determine influence. For example, person-to-person influence can be determined according to: a particular relationship type (a predefined constant); the amount of direct and indirect relationships between two nodes; the influence of those incoming and outgoing links and time (duration and recency). In a simple form of the weighted path algorithm, two people who are on the subcommittees of the board for two public companies boards (e.g., small groups that are important and meet often) for the last five years (such that they have many meetings and discussions over time) have a stronger relationship that two people that were on a large (50 person) nonprofit board 10 years ago.

In yet another implementation, a person's influence over a non person entity can be determined. This non-person entity can vary from a company to a film. Influence is calculated per instance based on, for example, relationship type (e.g., Board Member), time, size of company, or others with influence. Additionally, there is the concept of influence over others with influence over the organization).

In an implementation to gather overall influence of a person, the summation (a simplified version of the function used as an example) of the relationship instances or paths between two nodes is calculated. Meaning if someone is the founder, and the CEO, those two different relationships have different weights independently. The summation of these two relationships, or edges, gives us the overall influence that one entity has over another.

In an implementation, some nodes of the system are system-provided nodes. These nodes and their connections are created and updated by the system. Other persons (e.g., users or subscribers) do not create these nodes. In an implementation, administrators of the system update and provide the nodes. These administrators are persons trusted by the system to create and curate the data, so that there is a high level of quality (e.g., accuracy of data, timeliness of data) for information stored in the system. In an implementation, none of the administrators of the system are represented as a system-provided node.

In another implementation, a system-provided node is a node created by a person other than the person represented by the node. For example, if person A is a person represented by a system-provided node, a person other than person A creates the node. In another example, where an organization A is represented by a system-provided node, a person who is not a member of organization A creates the node. In an implementation, the user is denied access to editing a system-provided node.

In an implementation, a person who is represented by a system-provided node is prevented from editing the system-provided node representing themselves. In another implementation, a person who is represented by a system-provided node is allowed to edit a user node representing themselves.

In an implementation, each system-provided node has at least one connection (or edge). For example, each person node will be connected to at least one other node (e.g., another person, organization, entity). This is because system-provided nodes represent persons or entities with influence, and influence is determined in reference to two things (e.g., influence of one person over another person, influence of one person over an organization). So, a system-provided node without any connections would have very low influence, and would not be tracked by the system.

This application incorporates by reference U.S. patent application Ser. Nos. 13/224,110, 13/224,117, 13/224,119, 13/224,138, and Ser. No. 13/224,149, all filed Sep. 1, 2011; Ser. No. 13/225,377 and Ser. No. 13/225,380, both filed Sep. 2, 2011; U.S. patent application Ser. Nos. 13/236,602, 13/236,606, and Ser. No. 13/236,617, all filed Sep. 19, 2011; and U.S. patent application Ser. Nos. 13/532,653, 13/532,663, and Ser. No. 13/532,672, all filed Jun. 25, 2012.

In an implementation, the system allows users to tag "who they know" in the system. This means that a user believes there is some connection between them and those in the system (e.g., system-provided nodes, user nodes, or other). This connection can represent many different types of real-world relationships, including friendships, familial relationships, acquaintances, and other relationships. Connections added in this way become first-degree connections to the user. Using these first-degree connections of the user, the system can track connections between all the people in the system. For example, this allows the system to calculate who is two or more degrees away from the user.

In an implementation, the system hides groups of system-nodes that users are associated with from other users (e.g., groups are "double-blind"). This means that, even though two users can choose to share their connections with each other, the system prevents each user from seeing who the other user is connected with. For example, a user A has a group of connections in the system and a user B has a group of connection in the system. Even though user A and B are connected (e.g., user A has connected to user B, user B has connected to user A, or both), user A is prevented from seeing user B's group of connections, and vice versa.

In this example, the system can act as a broker (or intermediary), so that connections of user A can still benefit user B (e.g., doing a favor, recommendations on who to introduce, and many other uses), as discussed elsewhere in this application. This can also be referred to as a lens, which prevent users from seeing information associated with other users. For example, when a user A signs onto the system, the lens allows them to see their contacts in the system (e.g., system-provided nodes, other user nodes that have connected with the user) but not information about other user nodes. Some information other user nodes can include in the system are their full employment history, their connections with system-provided nodes of the system, and other information. These can be selectively hidden or shared from other users.

Users can be allies with each other so that they can help each other meet more people and make connections. Within the system, two users who are allies can be represented by a first-degree connection between nodes in the social graph. One or both user nodes can be ghost nodes. Further allied users can be connected via ghost edges in the social graph. In a further implementation, allied users in the social graph can be represented using an "allied" or similar edge between nodes of allied users.

As described above, a user of the system is represented as a ghost node generally cannot see other users of the system and their connections since those users will also be ghost nodes. However, the system can include some public users similar to a system-provided node. These public users are visible to ghost users. Connections between public users are visible to other users. A ghost user can be allied with a public user. However, other ghost users will not be able to see a connection between the public user and the ghost user.

In an implementation, the system continually tracks the background and activity for each profiled person (e.g., system-provided nodes, other persons tracked by the system). Some activities stored on profiled persons in the system include:

(1) Deals they have worked on as an investor or service provider (private deals);

(2) Companies they have worked at or served on boards of;

(3) Membership in a nonprofit board (e.g., a charity for an India-focused or "eyeglasses for the third world" type organization, each of which would expose the profiled person to information about India as a geographical location and nonprofit as a business model);

(4) Companies they have invested in (e.g., a public company, which are tracked by what public securities have invested in); and (5) Places people have worked (e.g., worked for Morgan Stanley™ Asia in their mergers and acquisitions group. Morgan Stanley is a trademark of Morgan Stanley).

In an implementation, along with the activities on profiled persons, the system also tracks companies and its associated industries. This means that the system tracks, as it would for a person, growth of a company (e.g., when a company expands to new areas, when a company drops a business area). This is used to correlate interests a user might have in finding out about an industry, but also about a specific company. For example, knowledge about one company may give insight about a target company—for instance, one might know the competitive landscape or issues facing the industry, or have information about a key supplier or customer of the target company because of where companies in the industry are going. A more detailed example is discussed elsewhere in this application.

In an implementation, the system evaluates (or checks) whether new information stored in the social graph (e.g., a system-provided node gains a new connection or a changed connection), affects user requests in the system. For example, if a person A in the social graph moves from being on the board of a technology company to a manufacturing company, the person has gained new relationships, expertise, and other insight into the manufacturing industry they may not have had when they were in the technology company. If a user had requested information from the system (e.g., query who they knew may have expertise in the manufacturing industry), when they first queried the system person A may not have appeared. However, when person A's node has been updated, the system will include person A in the user's query. The system can implement this check in a variety of methods. For example, the system can do this by polling (e.g., whenever a given interval of time has passed), on-the-fly (e.g., system monitors when new information is entered into the system), whenever a user asks the system to check user requests, whenever the user logs onto the system, or other methods.

In an implementation, the system allows a user to gain and maintain user nodes of the system as allies. Being an ally can mean different things for the user-including for each ally. This reflects how relationships in the real-world are not all equal. For instance, a user may be willing to do a certain favor for ally 1 but not for ally 2, where ally 1 is a close friend and ally 2 is an acquaintance.

In an implementation, whether a user is able to do a favor is hidden from a requestor of the favor. For instance, an ally 1 wants a favor from a user. Although the user can do the favor, they choose not to. However, in this situation, the user does not want the ally 1 to know that they could have done the favor, since this may appear unfavorably on the user. So, the system never shows to ally 1 that the user was in fact able to satisfy the favor. For example, the system can show to ally 1 that the request for the favor was transmitted, without indicating that the favor was declined.

In an implementation, the system allows a user to invite other persons to be their ally, whether they are already users or not. The system prevents the user from sending messages to other users of the system that they do not know by requiring the user to include identifying information on other users before they can contact them. For example, the system can require a user to know an e-mail address of another person in the system, before the system allows the user to message the other person. Other examples of identifying information that can be used, whether in conjunction or separately, are: a person's name, a person's birthday, their current position and title, company they work for, their maiden name (if applicable), where the person grew up, and other details stored by the system about users of the system. The system can allow a user to invite others to be their ally by the following:

1. User clicks a link in system to "Invite an Ally."

2. A "Mail To:" type email is spawned. The "To" field is blank, but the body of the e-mail's text is filled out. The User can e-mail someone for who they already have the email address (by filling out the "To:" section) to be their potential ally. This prevents spam from the system.

3. The body of the email is filled out with: (1) a link that the potential "Ally" can click to be an ally of the user (if the potential ally is already a user) and (2) some marketing text about the platform, enticing them to learn more and to join, in the case where the potential user is not already a user of the system.

4. Once a potential ally accepts the invitation to be an ally, the two people are "allies."

Included in this application are use cases of the invention. But it should be understood that the invention is not limited to the specific use cases presented. A use case of the invention may have additional steps (not necessarily described in this application), different parameters than in the use case, fewer or more parameters than the ones discussed, or any combination of these.

A sample flow of the system follows:

1. The system receives a request from a user: This user becomes a requestor. The requestor is associated with other users of the system (or allies).

2. The system analyzes how the request can be met: The system determines who can meet the request. This can be one or more persons. In an implementation, a person who can meet the request is someone with a connection to the requestor, as well as a connection to the request. The connection between the person and the requestor can be a one degree of separation apart. The connection between the person and the request can be a one or more degrees of separation apart (e.g., one, two, three, four, five degrees of separation).

3. The system generates a message to be sent to sent to the person (or persons): The message can optionally contain information on why the requestor wants the request, option of whether the person wants to help or ignore the request, how the person is related to the request, identity of a connection between the person and the request, or any combination of these. In an implementation, the requestor is prevented from knowing who the message is sent to (e.g., the requestor does not know that the person was sent the message). In an implementation, if the person rejects the request, the requestor is not notified.

In an implementation, the system provides suggestions and opportunities for allies to help each other. A common situation is where one user can help another user, by introducing the second user to a person the first user knows. Some example use cases where the system facilitates an introduction follow:

I. Introduction to "Types" of People

When a user signs up for the system, they can specify (or request) "types of people I would like to meet." These types include, for example, chief information officers (CIOs) of pension funds, technology venture capitalists, technology hedge fund managers, angel investors, and many other types of persons. For an ally of the user, an indication appears when they are able to satisfy the user's request. For example, this can appear when the ally logs in (first time or subsequent times) they see in their persistent left side navigation bar with a "Help Ally" link which includes a small red number to the upper right, signifying the number of "favors" they are in a position to do.

For instance, if User 1 has told the platform they want to meet "Tech VCs" and then User 2 (User 1's Ally) logs in, a "3" appears next to the "Help Ally" link. Clicking the link would show User 1's name, the type they have indicated they would like to meet and a list of the people that User 2 knows that he could introduce to User 1 to help them. In an implementation, the system does not display persons as a suggestion if a user already knows them. Using the example immediately above, this means that the list would be User 2's known Tech VCs minus User 1's known Tech VCs.

Also, User 1 does not know that User 2 has any relationships that can help, so if User 2 chooses "not to make an introduction" (e.g., by selecting a button that dismisses the favor he could do for User 1), User 1 would never have known that User 2 was in a position to help, let alone that he declined to help.

In another implementation, a user can choose and change what types of people they would like to know. At different times in a person's career they need different people and can add them to their list of needed introductions. This lets the system adjust and adapt to what a user needs, at any given time. For instance, sometimes you are looking for fundraising, sometimes you need a great divorce attorney, sometimes you want to meet venture capitalists specializing in technology.

II. Introductions to Certain Specific People or a Specific Group of People

User 1 has a pressing need to make connections to persons, such as when they need to discuss with persons to evaluate a business opportunity that may soon disappear. The system can do this by the following:

1. User 1 goes to person (or group or organization) profile in the system. Given that this request is time sensitive, User 1 requests the system to transmit a message to all their allies regarding this need (e.g., an all-points bulletin or APB).

2. The system then sends a message to User 1's allies. This can be done by e-mail or using the system's own messaging system. In an implementation, the system selects only those allies that can help to send the message. This can help reduce the overall number of messages user's of the system get. In another implementation, the system sends the message to all of the user's allies.

3. The system prepares a message with actionable information. For example, this can mean that for an ally 1, the system sends them a message showing how ally 1's connections (e.g., first degree, second degree or more) could satisfy the user's request. It also shows how many degrees ally 1 is away from those connections.

An example of this feature used in a real-world situation is when a user wants to get their child into a particular private school. The user uses the system to send an APB designating the board of the private school. The user's allies get a message showing how they can help get the user to a board member. This works even if the user can not see their allies privately entered connections.

III. Introductions to Certain Specific People or Groups

In this situation, similar to how a user 1 can enter "types" of people they want to meet, they can also enter specific people or groups of people they would like to meet. When a User 2 (an ally to User 1) can help a User 1, it shows up in their "Help Ally" link as a new favor they can do. User 2 can click into the Help Ally link, see which of their allies are seeking an introduction to which group, how they can help, and can choose to help or dismiss request. User 1 does not know that User 2 could have helped if User 2 chooses not to.

In an implementation, the system offers an ally suggestions on how to reply, if they choose not to help a user. For example, the system could suggest to reply to the user differently, such as "I know so-and-so, but our relationship really isn't good at the moment" or "although the system thinks I know so-and-so that fits your criteria, I really don't know that person." This is helpful where the ally is also a system-provided node, and is connected to someone as a system-provided node.

An example of this feature used in a real-world situation is when a user has a target list of clients and tags these people in the system as "groups I would like to meet." Let's say one such group is the Carlyle Group (or the TC Group, LLC). A path connecting a user 2 joins Carlyle Group (by passing through Morgan Stanley). Now the "Help Ally" lights up, showing the user 2 how they can help make an introduction to the Carlyle Group for the user.

In an implementation of a system, a method includes:

1. Providing a system accessible through a network such as the Internet to client devices. The system presents information on entities. The entities are stored in a social graph structure using nodes, and edges between the nodes represent relationships between the entities. Entities can represent people or organizations.

2. Receiving from a first user of a system a listing of specific types of people the first user would like to meet. The first user can be represented using a ghost node in the social graph of the system. The first user inputs to the system the types of people they are trying to meet. For example, a technology VC might be looking to meet technology entrepreneurs. Technology entrepreneurs might be looking to meet technology VCs.

The types of people can be defined in the system, and presented to the user for selection. The system can have types or categories of people based on their occupation, industry of employment, title or position at their place of work, services they provides, and others.

3. Notifying a second user having a first-degree connection to the first user that the first user has identified specific types of people the first user would like to meet. The system can recognize the second user as an ally of the first user by way of the first-degree connection. Then the system presents the second user with messages indicating they might be able to help the first user ally.

The second user can have a toolbar or other indictor or an aggregate of things they might be able to do to help allies (including the first user and other users who are allies to the second user). The notification is not a direct notification from the first user to the second user, but rather the system acts as an intermediary to facilitate presenting this information to the second user.

The technique of notifying can include: displaying on a computer screen a graphical icon representative of a number of system-identified tasks the second user can perform; and incrementing the number of system-identified tasks the second user can perform to include potentially helping the first user. The number is incremented after the first user has added people he would like to meet.

4. Providing the second user a first option of making an electronic introduction to the first user of a third person having a first-degree connection to the second user which is of the specific type the first user would like to meet.

For example, the second user can click the tool bar and see a menu or list of things they can do for the first user. This list can include a person the second user has a first-degree connection who is of the type (e.g., occupation type) that the first user is looking to meet. Generally, the system will not include in the list people that the first user already has a first-degree connection to, since the first user does not need an introduction to meet people he already knows.

The technique of determining the third person can include: determining a first listing of people having a first-degree connection to the second user and one of the specific types identified by the first user; and removing from the first listing people having a one-degree connection with the first user, which results in a second listing. The second listings can include the third person. The second listing can be ranked by the system to identify the people who would be the best candidates for the second user to introduce to the first user.

The technique can include: displaying on a computer screen for the second user a name of the first user; displaying on the computer screen for the second user the identified specific types of people the first user is interested in meeting; and displaying on the computer screen for the second user a list of people a first-degree connection to the second user which is of the specific type the first user would like to meet from which to select from for making an electronic introduction.

Some specific types of people the first user would like to meet can include chief information officers of pension funds, technology venture capitalists, technology hedge fund managers, bankers, investment bankers, stock brokers, insurance brokers, accountants, chief financial officers, and many other occupation types.

The electronic introduction can be by way of an electronic message (e.g., e-mail) sent from the second user to the first user. The system can present a introduction message to the second user, which the second user can alter as desired.

5. Providing the second user a second option of declining to make an electronic introduction to the first user, where the first user is not notified that the second user has declined to make the electronic introduction. The second option can be optional and the second user can simply choose not to make the introduction.

Because the system acts as intermediary, when the second user declines making an electronic introduction for the first user, the first user will not know the second user has declined. If the first user had known might negatively affect the relationship between the first and second user.

In an implementation of a system, a method includes:
1. Providing a system accessible through a network to client devices. The system presents information on entities, where the entities are stored in a social graph structure using nodes, and edges between the nodes represent relationships between the entities.

2. Receiving from a first user of a system an identity of at least one entity the first user would like to meet. For example, the entity can be a person, organization, or group of people (e.g., board of a certain company).

3. Notifying a second user having a first-degree connection to the first user that the first user has identified a entity the first user would like to meet, where the first user has a first-degree connection to the identified person. The first and second users may be represented as ghost nodes in the social graph.

4. Providing the second user a first option of making an electronic introduction to the first user of a identified entity.

5. Providing the second user a second option of declining to make an electronic introduction to the first user of the identified entity.

In the event the identified entity is visible to the first user as having a first-degree connection to the second user, the system can provide an option to send a message to the second user because if the second user were to do nothing, this nonconduct is visible to the first user, and may harm the relationship between the first and second user.

So the system can provide a message template to the second user for sending to the first user. This message template can include language indicating a relationship between the identified entity and the second user is not sufficiently strong for the second user to an introduction. The second user is permitted to alter the message template by modifying system-generated language. This message will help prevent harming the relationship better the first and second user.

In an implementation of a system, a method includes:
1. Providing a system accessible through a network to client devices. The system presents information on entities, where the entities are stored in a social graph structure using nodes, and edges between the nodes represent relationships between the entities.

2. Receiving from a first user of a system a listing of specific types of people the first user would like to meet.

3. Sending a message to a second user having a first-degree connection to the first user that the first user has identified specific types of people the first user would like to meet, where the message is not sent to directly from the first user to the second user.

Rather than using a notifications toolbar as in the above examples, the system can a message to the specific users to help. This is useful in more urgent situations where timing is more important. Users are more likely to respond to an urgent directed message rather than seeing their notifications toolbar increment, for example, from 20 to 21 tasks they might be able to help with.

4. Providing the second user a first option of making an electronic introduction to the first user of a third person having a connection to the second user which is of the specific type the first user would like to meet. The third person can have a first-degree connection to the second user.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
   providing a first user connected to a system with access to a social graph, wherein the first user is allied with a first set of nodes of the social graph specified by the first user and the social graph comprises:
   providing in the social graph a first type of node, referred to as a user-provided node, and a first type of edge, referred to as a user-provided edge, wherein user-provided edges include information provided by users of the system; and
   providing in the social graph a second type of node, referred to as a system-provided node, and a second type of edge, referred to as a system-provided edge, wherein system-provided nodes and system-provided edges include information gathered by the system;
   maintaining the social graph comprising:
   allowing system-provided nodes to be coupled to other system-provided nodes by system-provided edges;
   allowing user-provided nodes to be coupled to system-provided nodes by user-provided edges;
   disallowing user-provided nodes from being coupled to other user-provided nodes or to system-provided nodes using system-provided edges; and
   disallowing system-provided nodes from being coupled to other system-provided nodes using user-provided edges;
   representing the first user as a first user-provided node in the social graph;
   representing the first set of nodes in the social graph as a first set of user-provided nodes;
   coupling the first user-provided node with the first set of user-provided nodes by user-provided edges;
   allowing the first user to enter a request to the system, wherein the request comprises identifying a first system-provided node of the social graph;
   determining using the system that a first relationship of a second user-provided node of the first set of user-provided nodes satisfies the request, wherein the second user-provided node represents a second user and the first relationship comprises a path with at least one system-provided node and at least one system-provided edge in the social graph;
   determining a first user-provided edge couples the second user-provided node with the first system-provided node and the first user is disallowed from viewing the first user-provided edge coupling the second user-provided node with the first system-provided node; and
   indicating to the second user they are able to satisfy the request, without indicating to the first user that the second user is able to satisfy the request.

2. The method of claim 1 further comprising:
   allowing the second user to dismiss the request from the first user in the system, transparent to the first user.

3. The method of claim 1 further comprising:
   if the second user agrees to satisfy the request, transmitting a message from the system to the first user that the second user is connected to the first node.

4. The method of claim 3 wherein the message comprises a summary of the first relationship.

5. The method of claim 1 wherein the second user agrees to be an ally of the first user.

6. The method of claim 1 wherein each node of the first set of nodes are user nodes.

7. The method of claim 1 wherein the second user is prevented from viewing membership in the first set of nodes.

8. The method of claim 1 wherein the first node is a system-provided node.

9. The method of claim 1 wherein the first set of nodes are selected by the first user.

10. The method of claim 1 wherein the social graph contains a plurality of system-provided nodes and each system-provided node is connected to at least one other system-provided node by system-provided edges.

11. The method of claim 1 wherein the first and second users are connected in the social graph by a user provided edge.

12. A method comprising:
    providing a first user connected to a system with access to a social graph, wherein the first user is allied with a first set of nodes of the social graph and the social graph comprises:
    providing in the social graph a first type of node, referred to as a user-provided node, and a first type of edge, referred to as a user-provided edge, wherein user-provided edges include information provided by users of the system; and
    providing in the social graph a second type of node, referred to as a system-provided node, and a second type of edge, referred to as a system-provided edge, wherein system-provided nodes and system-provided edges include information gathered by the system;
    maintaining the social graph comprising:
    allowing system-provided nodes to be coupled to other system-provided nodes by system-provided edges;
    allowing user-provided nodes to be coupled to system-provided nodes by user-provided edges;
    disallowing user-provided nodes from being coupled to other user-provided nodes or to system-provided nodes using system-provided edges; and
    disallowing system-provided nodes from being coupled to other system-provided nodes using user-provided edges;
    allowing the first user to enter a request to the system;
    determining using the system that a first relationship of a first node of the first set of nodes satisfies the request, wherein the first node represents a second user and the first relationship comprises a path with at least one system-provided node and at least one system-provided edge in the social graph;
    determining using the system that a second relationship of the first node of the first set of nodes satisfies the request; and indicating to the second user they are able to satisfy the request based on the first and second relationships.

13. The method of claim 12 further comprising:
allowing the user to select the first relationship and not the second relationship in the system; and
transmitting a message from the system to the first user that the second user is connected to the first node by the first relationship.

14. The method of claim 12 wherein the indicating to the second user they are able to satisfy the request based on the first and second relationships does not indicate to the first user that the second user is able to satisfy the request.

15. The method of claim 12 wherein the request comprises a group of persons represented by system-provided nodes in the social graph.

16. A method comprising:
providing a user with access to a system, wherein the user is connected in the system with a group of persons comprising user-provided nodes and non-users of the system comprising system-provided nodes;
maintaining the system comprising:
allowing system-provided nodes to be coupled to other system-provided nodes by system-provided edges;
allowing user-provided nodes to be coupled to system-provided nodes by user-provided edges;
disallowing user-provided nodes from being coupled to other user-provided nodes or to system-provided nodes using system-provided edges; and
disallowing system-provided nodes from being coupled to other system-provided nodes using user-provided edges;
allowing the user to specify a request to the system;
determining by the system whether the group of persons can satisfy the request, wherein the request is satisfied when there is an intermediate person connected to a first person of the group of persons and the request, and the intermediate person is represented as a system-provided node coupled by a system-provided edge; and
indicating to the first person of the group of persons by a message that they can satisfy the request, without indicating to the user that that first person of the group of persons can satisfy the request.

17. The method of claim 16 wherein the message comprises:
a first piece of information specifying the request of the user;
a second piece of information specifying the intermediate person; and
a third piece of information specifying how the intermediate person satisfies the request.

18. The method of claim 16 wherein the request comprises a business sector.

19. The method of claim 16 wherein the request comprises a geographic region.

20. The method of claim 1 wherein the determining using the system that a first relationship satisfies the request comprises:
retrieving a plurality of system-provided edges directly coupled to the first system-provided node specified by the system; and
determining the second user-provided node is coupled to at least one of the plurality of system-provided edges.

21. The method of claim 1 further comprising:
when the second user indicates they are unwilling to satisfy the request, disallow notifying the first user about the first relationship.

22. The method of claim 1 further comprising:
coupling the first user-provided node with the second user-provided node; and
disallowing the first user represented by the first user-provided node to view in the social graph the first user-provided edge coupling the second user-provided node and the first system-provided node.

23. The method of claim 1 wherein the system-provided nodes and system-provided edges including information gathered by the system comprises:
receiving unfiltered information from an on-line source;
filtering the unfiltered information to obtain first information on a first entity;
filtering the unfiltered information to obtain second information on a second entity;
creating the first system-provided node to represent the first entity, wherein the first system-provided node is added to a social graph with a plurality of system-provided nodes and a plurality of system-provided edges connecting system-provided nodes;
creating a second system-provided node to represent a second entity and adding the second system-provided node to the social graph;
associating the first information to the first system-provided node; and
associating the second information to the second system-provided node.

24. The method of claim 1 wherein the social graph further comprises:
precluding coupling user-provided nodes to system-provided edges; and
precluding coupling system-provided nodes to other system-provided nodes via user-provided edges.

25. The method of claim 1 wherein none of the system-provided edges of the system-provided edges are connected to a user-provided node.

26. The method of claim 1 wherein none of the user-provided edges of the user-provided edges are connected to more than one system-provided node.

27. The method of claim 16 wherein the system-provided edge is coupled to a system-provided node representing the first person.

* * * * *